US012089134B2

(12) United States Patent
Hsu et al.

(10) Patent No.: US 12,089,134 B2
(45) Date of Patent: Sep. 10, 2024

(54) METHOD AND APPARATUS FOR SETTING UP COORDINATED SERVICE PERIOD IN MULTIPLE ACCESS POINT ENVIRONMENT

(71) Applicant: MEDIATEK INC., Hsin-Chu (TW)

(72) Inventors: Chien-Fang Hsu, Hsinchu (TW); Chao-Chun Wang, San Jose, CA (US); James Chih-Shi Yee, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 209 days.

(21) Appl. No.: 17/522,918

(22) Filed: Nov. 10, 2021

(65) Prior Publication Data

US 2022/0150796 A1    May 12, 2022

Related U.S. Application Data

(60) Provisional application No. 63/112,663, filed on Nov. 12, 2020.

(51) Int. Cl.
*H04W 40/38* (2009.01)
*H04W 48/00* (2009.01)
*H04W 76/15* (2018.01)
*H04W 88/08* (2009.01)
*H04W 88/12* (2009.01)

(52) U.S. Cl.
CPC ........... *H04W 40/38* (2013.01); *H04W 48/17* (2013.01); *H04W 76/15* (2018.02); *H04W 88/08* (2013.01); *H04W 88/12* (2013.01)

(58) Field of Classification Search
CPC ..... H04W 40/38; H04W 48/17; H04W 48/20; H04W 88/08; H04W 88/12; H04W 84/12
See application file for complete search history.

(56) References Cited

U.S. PATENT DOCUMENTS

| | | | |
|---|---|---|---|
| 9,980,296 B2 | 5/2018 | Wang | |
| 2015/0359008 A1 | 12/2015 | Wang | |
| 2019/0075563 A1* | 3/2019 | Babaei | ............... H04L 5/0094 |
| 2020/0137702 A1* | 4/2020 | Patil | ............... H04W 56/001 |
| 2020/0267636 A1 | 8/2020 | Cavalcanti | |

FOREIGN PATENT DOCUMENTS

| | | |
|---|---|---|
| CN | 103354663 A | 10/2013 |
| CN | 109863804 A | 6/2019 |
| WO | 2020218970 A1 | 10/2020 |

* cited by examiner

*Primary Examiner* — Jamal Javaid
(74) *Attorney, Agent, or Firm* — Winston Hsu

(57) ABSTRACT

An access point (AP) includes a transmitter (TX) circuit, a receiver (RX) circuit, and a control circuit. The control circuit negotiates with at least one another AP via the TX circuit and the RX circuit, for setting up a coordinated service period (SP). In addition, a method for setting up the coordinated SP in a multiple AP environment includes: sending a request frame from a first AP to at least one second AP, wherein the request frame includes a plurality of SP parameters; receiving a response frame generated from the at least one second AP in response to the request frame; and in response to the response frame, setting up the coordinated SP by sending a setup frame to the at least one another AP, wherein the setup frame is set by updating at least a portion of the plurality of SP parameters.

17 Claims, 3 Drawing Sheets

METHOD AND APPARATUS FOR SETTING UP COORDINATED SERVICE PERIOD IN MULTIPLE ACCESS POINT ENVIRONMENT

CROSS REFERENCE TO RELATED APPLICATIONS

This application claims the benefit of U.S. Provisional application No. 63/112,663, filed on Nov. 12, 2020 and incorporated herein by reference.

BACKGROUND

The present invention relates to wireless communications, and more particularly, to a method and apparatus for setting up a coordinated service period in a multiple access point environment.

In a wireless fidelity (WiFi) communication system, an access point (AP) of a first basic service set (BSS) may communication with an AP of a second BSS, and may communicate with one or more non-AP stations (STAs) in the first BSS. In an infrastructure network, there is one AP per BSS. Among BSSs, the typical AP to AP communication is Ad Hoc, and channel access is based on sensing. However, AP to AP communications have not been addressed fully in IEEE 802.11 specification. For example, in an environment that several BSSs share the same frequency resources in close proximity, wireless communications suffer from an overlapping BSS (OBSS) problem. The OBSS problem refers to situations that two or more BSSs, unrelated to each other, are operating in the same channel and are close enough, where each BSS operates independently and competes for resources for its own service. Thus, there is a need for an innovative design to coordinate operations of APs in a multiple AP environment during a service period, which may achieve OBSS interference mitigation, guaranteed quality of service (QoS), and/or predictable transmit and receive behaviors during the service period.

SUMMARY

One of the objectives of the claimed invention is to provide a method and apparatus for setting up a coordinated service period in a multiple access point environment.

According to a first aspect of the present invention, an exemplary access point (AP) is disclosed. The exemplary AP includes a transmitter (TX) circuit, a receiver (RX) circuit, and a control circuit. The control circuit is arranged to negotiate with at least one another AP via the TX circuit and the RX circuit, for setting up a coordinated service period (SP).

According to a second aspect of the present invention, an exemplary method for setting up a coordinated service period (SP) in a multiple access point (AP) environment is disclosed. The exemplary method includes: sending a request frame from a first AP to at least one second AP, wherein the request frame comprises a plurality of SP parameters; receiving a response frame generated from the at least one second AP in response to the request frame; and in response to the response frame, setting up the coordinated SP by sending a setup frame to the at least one another AP, wherein the setup frame is set by updating at least a portion of the plurality of SP parameters.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
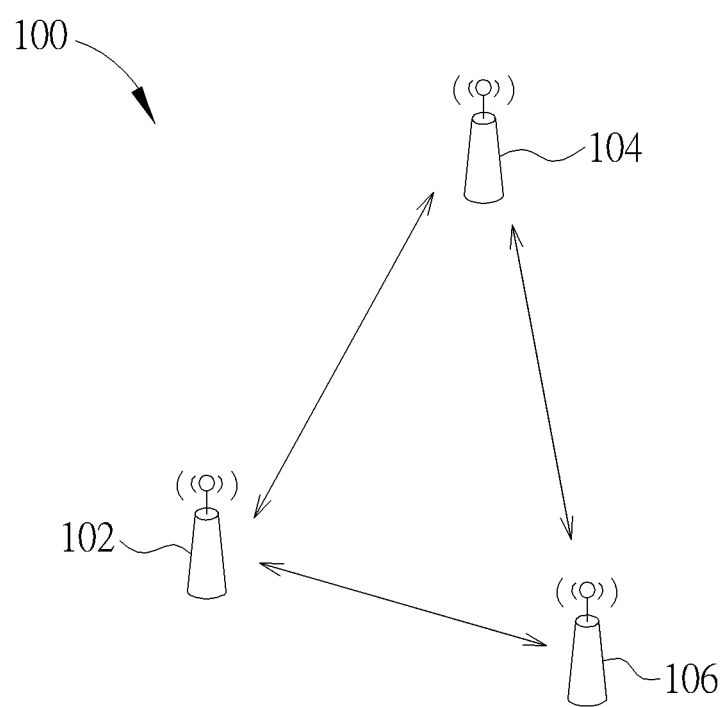
FIG. 1 is a diagram illustrating topology of a multiple access point environment that supports a proposed service period coordination scheme according to an embodiment of the present invention.

FIG. 1 is a diagram illustrating topology of a multiple access point (AP) environment that supports a proposed service period (SP) coordination scheme according to an embodiment of the present invention. In this embodiment, a coordination group 100 is formed by multiple APs 102, 104, 106 that share partially/fully overlapped frequency bands. Hence, the AP 102 is capable of communicating with neighboring APs 104 and 106, the AP 104 is capable of communicating with neighboring APs 102 and 106, and the AP 106 is capable of communicating with neighboring APs 102 and 104. In a case where the AP 102 acts as a master AP that initiates SP coordination, the neighboring APs 104 and 106 act as coordination APs, and the master AP 102 can negotiate with coordination APs 104 and 106 for setting up a coordinated SP. In a case where the AP 104 acts as a master AP that initiates SP coordination, the neighboring APs 102 and 106 act as coordination APs, and the master AP 104 can negotiate with coordination APs 102 and 106 for setting up a coordinated SP. In a case where the AP 106 acts as a master AP that initiates SP coordination, the neighboring APs 102 and 104 act as coordination APs, and the master AP 106 can negotiate with coordination APs 102 and 104 for setting up a coordinated SP. In this embodiment, the coordination group 100 consists of three APs. However, this is for illustrative purposes only, and is not meant to be a limitation of the present invention. In practice, the coordination group 100 may be formed by K APs, where K is a positive integer not smaller than 2 (i.e., K≥2). Further details of the proposed SP coordination scheme are described as below, with reference to accompanying drawings.

Figure 2:
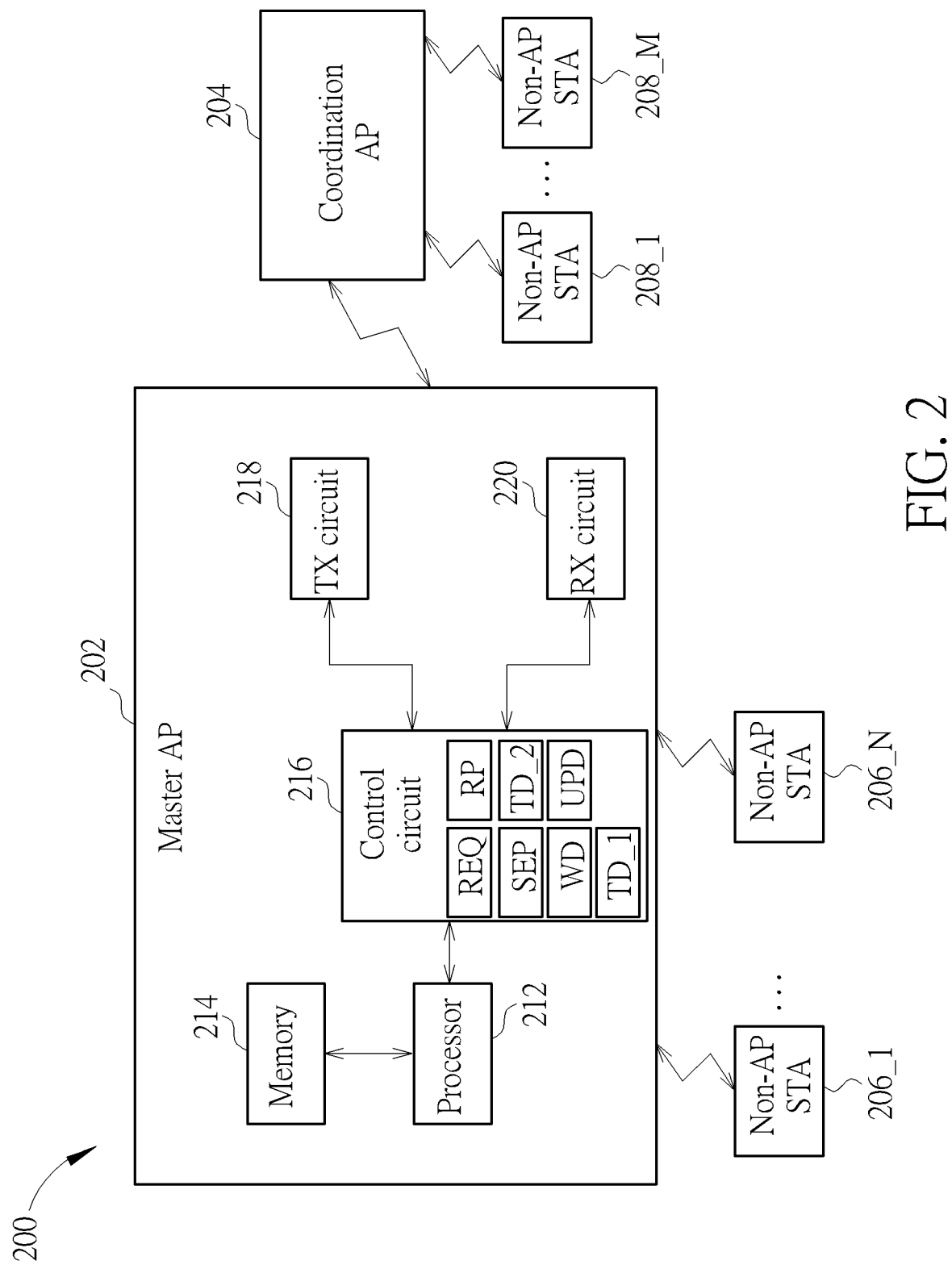
FIG. 2 is a diagram illustrating a wireless fidelity communication system according to an embodiment of the present invention.

FIG. 2 is a diagram illustrating a wireless fidelity (WiFi) communication system according to an embodiment of the present invention. The WiFi communication system 100 has a plurality of wireless communication devices, including a master AP 202 (which initiates SP coordination), a coordination AP 204 (which is involved in the SP coordination initiated by master AP 202), and a plurality of non-AP stations (STAs) 206_1-206_N, 208_1-208_M, where N≥1 and M≥1. The master AP 202 may be one of the APs 102, 104, 106 included in the coordination group 100 shown in FIG. 1, and the coordination AP 204 may be another of the APs 102, 104, 106 included in the coordination group 100 shown in FIG. 1. Specifically, the master AP 202 may be any AP in a coordination group that initiates SP coordination, and the coordination AP 204 may be any AP in the same coordination group that is involved in the SP coordination initiated by the master AP 202. For better comprehension of the proposed SP coordination scheme, only a single coordination AP is illustrated in FIG. 2. A person skilled in the art should readily appreciate that the proposed SP coordination scheme may be employed by a coordination group having more than one coordination AP involved in SP coordination initiated by the master AP 202, where the interaction between the master AP 202 and the coordination AP 204 is the same as the interaction between the master AP 202 and other coordination AP (not shown). Hence, the coordination AP 204 shown in FIG. 2 may stand for each of a plurality of coordination APs that are involved in SP coordination initiated by the master AP 202 if the coordination group has more than two APs, and may stand for a single coordination AP that is involved in SP coordination initiated by the master AP 202 if the coordination group has only two APs.

The master AP 202 and the coordination AP 204 belong to different basic service sets (BSSs). One BSS may include the master AP 202 and one or more non-AP STAs 206_1-206_N (N≥1) associated to the master AP 202. Another BSS may include the coordination AP 204 and one or more non-AP STAs 208_1-208_M (M≥1) associated to the coordination AP 204. By way of example, but not limitation, the WiFi communication system 200 may be in compliance with IEEE 802.11ax and/or IEEE 802.11be standard.

As shown in FIG. 2, the master AP 202 includes a processor 212, a memory 214, a control circuit 216, a transmitter (TX) circuit 218, and a receiver (RX) circuit 220. The memory 214 is arranged to store a program code. The processor 212 is arranged to load and execute the program code to manage the master AP 202. The control circuit 216 is arranged to control wireless communications with the coordination AP 204 and non-AP STAs 206_1-206_N. In this embodiment, the control circuit 216 may negotiate with the coordination AP 204 via the TX circuit 218 and the RX circuit 220, for setting up a coordinated SP.

The coordinated SP may be used by the master AP 202 alone or shared by the master AP 202 and the coordination AP 204, depending upon the actual service requirements. For example, one AP may initiate SP coordination for coordinating APs in a multiple AP environment to share a service period reserved for specific services. Specifically, the proposed SP coordination scheme is capable of coordinating APs in the multiple AP environment to share a service period during which behaviors of all STAs in the multiple AP environment are well regulated.

A first usage scenario of the proposed SP coordination scheme is a latency sensitive application. Inside a BSS, a STA may ask for a service period for its latency sensitive traffic to transmit so that the latency and jitter can be guaranteed. This traffic is usually periodic, and an amount of transmission data is predictable in advance. An AP in the BSS may allocate a proper service period periodically for the STA, and try to make other STA(s) in the BSS quiet during that service period. However, for other BSSs which are close to the BSS and share the same frequency bands, during the service period, transmission from those BSSs may still happen and interfere with the traffic within the BSS. To address this issue, the proposed SP coordination scheme may be employed to achieve coordination of BSSs by setting up a coordinated SP, such that OBSS interference mitigation can be provided during the coordinated SP.

A second usage scenario of the proposed SP coordination scheme is multi-AP joint sounding. In a multi-AP system, multiple APs need to perform sounding procedures to a specific STA, so that APs can do joint transmission to the specific STA later. The sounding results need to be updated periodically. Instead of each AP requesting joint sounding based on its own schedule, a negotiated and pre-allocated time period set up by the proposed SP coordination scheme for doing joint sounding can provide overhead saving of sounding request/response exchange and/or schedule optimization inside each BSS.

A third usage scenario of the proposed SP coordination scheme is an inter BSS point-to-point (P2P) communication. For STAs that are associated to different APs and need to perform P2P communication, each STA can send a request to its associated AP, and the proposed SP coordination scheme enables APs to allocate a common service period to the pair of STAs, so that interference can be reduced.

Figure 3:
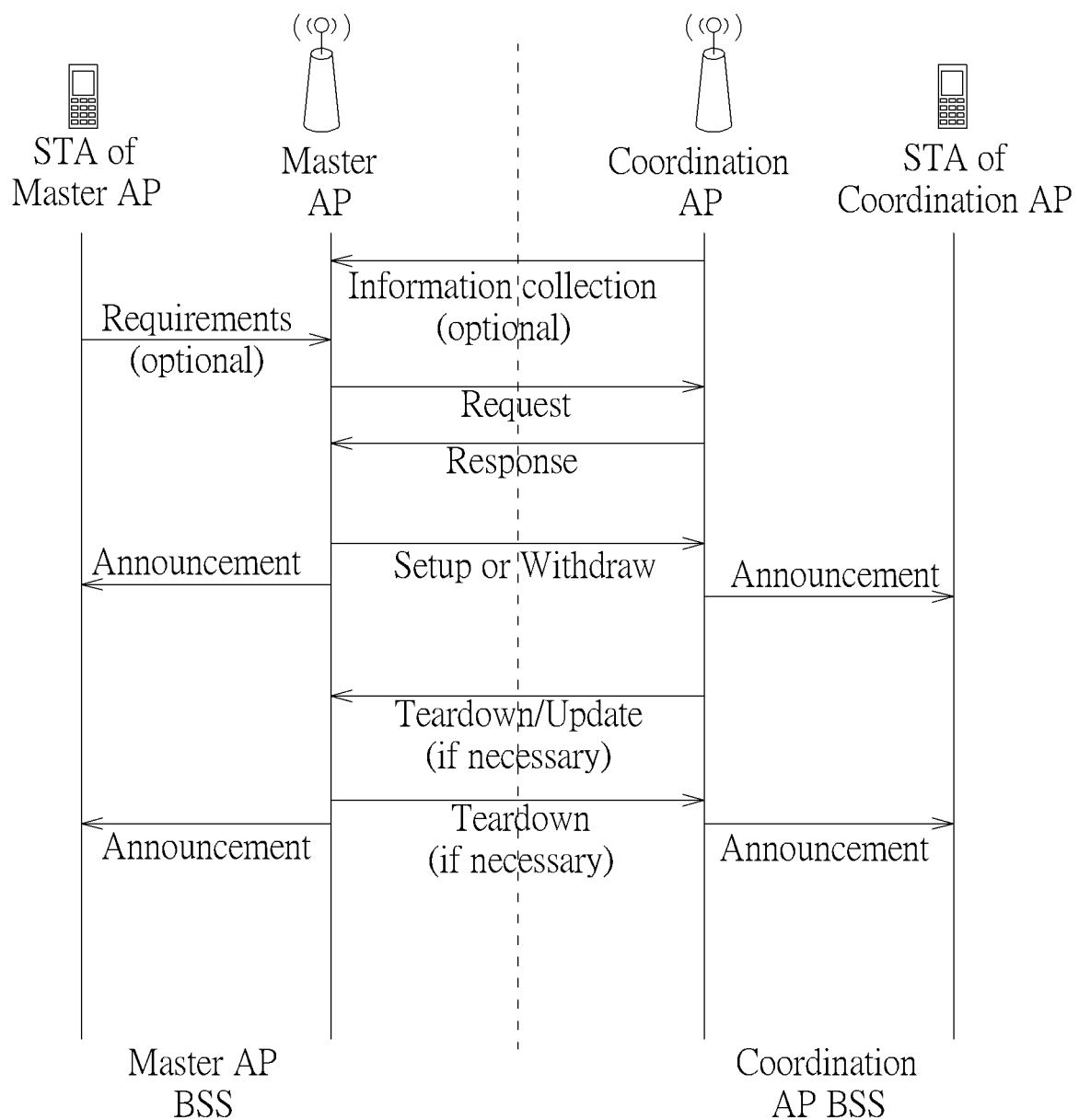
FIG. 3 is a sequence diagram illustrating interactions associated with SP coordination according to an embodiment of the present invention.

Please refer to FIG. 2 and FIG. 3. FIG. 3 is a sequence diagram illustrating interactions associated with SP coordination according to an embodiment of the present invention. The control circuit 216 of the master AP 202 may perform information collection from other BSS(s). In this embodiment, SP parameters may be determined based at least partly on information collected from the coordination AP 204. The information collected from the coordination AP 204 may contain necessary parameters required to apply during the coordinated SP. Taking an inter BSS P2P communication service for example, the information collected from the coordination AP 204 may include TX power and clear channel assessment (CCA) level that are helpful to apply coordinated spatial reuse (CSR). It should be noted that information collection from other BSS(s) may be optional. For example, when a particular usage scenario of the proposed SP coordination scheme does not need the information collected from the coordination AP 204 for setting up the coordinated SP, the information collection phase may be omitted.

The control circuit 216 of the master AP 202 may perform traffic requirement collection inside individual BSS, such that SP parameters may be determined based at least partly on a traffic requirement collected from at least one non-AP STA. Taking a latency sensitive application and inter BSS P2P communication service for example, the traffic requirement collected from the non-AP STA 206_i (1≤i≤N) in the BSS of the master AP 202 may include parameters, such as a traffic start time, repetition period and number of repetitions, traffic size, required time period to transmit and receive, and maximum jitter. For the inter BSS P2P communication service, the traffic requirement collected from the non-AP STA 206_i (1≤i≤N) in the BSS of the master AP 202 may include extra parameters, such as the peer identifier (ID) and its BSS information. It should be noted that the traffic requirement collection inside individual BSS may be optional. For example, when a particular usage scenario of the proposed SP coordination scheme does not need the traffic requirement information collected from non-AP STA (s) for setting up the coordinated SP, the traffic requirement collection phase may be omitted.

The control circuit 216 of the master AP 202 may perform local requirement collection inside the master AP 202, such that SP parameters may be determined based at least partly on own requirements of the master AP 202. Taking a multi-AP joint sounding service for example, the requirements of the master AP 202 may include a joint sounding frequency. It should be noted that the local requirement collection inside the master AP 202 may be optional. For example, when a particular usage scenario of the proposed SP coordination scheme does not need the local requirement information of the master AP 202 for setting up the coordinated SP, the local requirement collection phase may be omitted.

To put it simply, the control circuit 216 of the master AP 202 may perform SP parameter generation according to information collection from other BSS(s), traffic requirement collection inside individual BSS, and/or local requirement collection inside master AP 202. After the SP parameters are determined, the control circuit 216 of the master AP 202 initiates SP coordination by sending a request frame REQ to the coordination AP 204 via the TX circuit 218, where the request frame REQ includes the SP parameters. One SP coordination between the master AP 202 and the coordination AP 204 may be used to set up a periodic coordinated SP to serve periodic traffic requirements, or may be used to dynamically set up a one-time coordinated SP to serve Ad Hoc requirements.

With regard to a regular setup procedure for setting up a periodic coordinated SP, the SP parameters carried by the request frame REQ may contain a period, an offset of the period from the transmission frame, repetitions of the period, a sharing method, and optional parameters based on the sharing method. For example, the sharing method may be set by one of frequency division multiple access (FDMA), time division multiple access (TDMA), coordinated spatial reuse (CSR), and use alone (i.e., no resource sharing of the period). When the sharing method is use alone, the request frame REQ is arranged to request to use the coordinated SP alone. When the sharing method is one of FDMA, TDMA, and CSR, the request frame REQ is arranged to request to share resources of the coordinated SP. Regarding the sharing method being FDMA, an available band may be partitioned into several portions, and each AP in the coordination group may only use an assigned portion during the coordinated SP. Regarding the sharing method being TDMA, the coordinated SP may be partitioned into several sub-SPs, and each AP in the coordination group may only use an assigned sub-SP during the coordinated SP. Regarding the sharing method being CSR, APs in the coordination group may share the coordinated SP by applying SR.

In some embodiments of the present invention, when the sharing method is set by FDMA, a parameter indicative of a frequency map may be included in the SP parameters carried by the request frame REQ; when the sharing method is set by TDMA, a parameter indicative of time division information may be included in the SP parameters carried by the request frame REQ; and when the sharing method is set by CSR, parameters indicative of TX power reduction and CCA level adjustment may be included in the SP parameters carried by the request frame REQ.

With regard to an Ad Hoc setup procedure for setting up a coordinated SP for one-time usage, the SP parameters carried by the request frame REQ may contain a period, an offset of the period from the transmission frame (i.e., request frame REQ), a sharing method, and optional parameters based on the sharing method. In contrast to the regular setup procedure, the Ad Hoc setup procedure does not have a parameter indicative of repetitions of the period.

After receiving the request frame REQ sent from the master AP 202, the coordination AP 204 responds with a response frame RP. Hence, the control circuit 216 of the master AP 202 receives the response frame RP from the coordination AP 204 via the RX circuit 220. In a case where the request frame REQ is arranged to request to use the coordinated SP alone, the coordination AP 204 may respond with its coordination level. For example, when the coordination level carried by the response frame RP is set by a first value indicative of high coordination at the coordination AP 204, the master AP 202 is informed that, during the coordinated SP, the coordination AP 204 will stop all traffic inside its BSS. For another example, when the coordination level carried by the response frame RP is set by a second value indicative of medium coordination at the coordination AP 204, the master AP 202 is informed that, during the coordinated SP, the coordination AP 204 will try to stop traffic inside its BSS and/or try to reduce TX power inside its BSS. For yet another example, when the coordination level carried by the response frame RP is set by a third value indicative of low coordination at the coordination AP 204, the master AP 202 is informed that, during the coordinated SP, the coordination AP 204 has no traffic control intension inside its BSS. Furthermore, when the coordination AP 204 is unable to stop traffic in its BSS, the coordination AP 204 may provide BSS load information to the master AP 202, such that the master AP 202 can refer to the BSS load information carried by the response frame RP to estimate interference accordingly.

In another case where the request frame REQ is arranged to request to share resources of the coordinated SP, the coordination AP 204 may respond with the response frame RP to accept or reject SP coordination initiated by the master AP 202. For example, the coordination AP 204 may reject with a counter sharing arrangement.

After receiving the response frame RP from the coordination AP 204, the control circuit 216 of the master AP 202 may send a setup frame SEP to the coordination AP 204 via the TX circuit 218 for setting up the coordinated SP. For example, the setup frame SEP may be configured by updating at least a portion (i.e., part or all) of the SP parameters that are included in the request frame REQ. For example, the setup frame SEP for setting up a periodic coordinated SP may contain partially/fully updated SP parameters, including a period, an offset of the period from the transmission frame, repetitions of the period, a sharing method, and optional parameters based on the sharing method. For another example, the setup frame SEP for setting up a one-time coordinated SP may contain partially/fully updated SP parameters, including a period, an offset of the period from the transmission frame, a sharing method, and optional parameters based on the sharing method. Alternatively, after receiving the response frame RP from the coordination AP 204, the control circuit 216 of the master AP 202 may send a withdrawal announcement frame WD to the coordination AP 204 via the TX circuit 218 for withdrawing SP coordination initiated by the master AP 202.

After the setup frame SEP is sent for setting up the coordinated SP, the master AP 202 may make announcement inside its BSS to inform that the coordinated SP has been created. After the setup frame SEP is received by the coordination AP 204, the coordination AP 204 may make announcement inside its BSS to inform that the coordinated SP has been created. In some embodiments of the present invention, the coordination AP 204 may take action to reduce interference to other BSS during the coordinated SP. For example, actions of the coordination AP 204 to reduce interference to other BSS during the coordinated SP may include quieting an STA during a period not assigned by the coordination AP 204 under TDMA, performing a subchannel selective transmission (SST) operation based on FDMA assignment, triggering STA's uplink (UL) traffic with power reduction, and/or performing SR with downlink (DL) power reduction and CCA level adjustment.

It is possible that, due to certain factors, the coordination AP 204 may tear down the SP coordination before the end time indicated by the setup frame SEP. Hence, after setup of the coordinated SP is completed, the control circuit 216 of the master AP 202 may receive a teardown announcement frame TD_2 from the coordination AP 204 via the RX circuit 220, where the teardown announcement frame TD_2 sent by the coordination AP 204 is arranged to tear down SP coordination between the master AP 202 and the coordination AP 204. After the teardown announcement frame TD_2 is sent for tearing down the SP coordination, the coordination AP 204 may make announcement inside its BSS to inform that the coordinated SP has been torn down. After receiving the teardown announcement frame TD_2, the master AP 202 may make announcement inside its BSS to inform that the coordinated SP has been torn down.

It is possible that, due to certain factors, the master AP 202 may tear down the SP coordination before the end time indicated by the setup frame SEP. Hence, after setup of the coordinated SP is completed, the control circuit 216 of the master AP 202 may send a teardown announcement frame TD_1 to the coordination AP 204 via the TX circuit 218, where the teardown announcement frame TD_1 sent by the master AP 202 is arranged to tear down SP coordination between the master AP 202 and the coordination AP 204. After the teardown announcement frame TD_1 is sent for tearing down the SP coordination, the master AP 202 may make announcement inside its BSS to inform that the coordinated SP has been torn down. After receiving the teardown announcement frame TD_1, the coordination AP 204 may make announcement inside its BSS to inform that the coordinated SP has been torn down.

Considering a case where the request frame REQ is arranged to request to use the coordinated SP alone, the coordination AP 204 may be allowed to change its coordination level after setup of the coordinated SP is completed. For example, the coordination AP 204 may send another response frame UPD. Hence, the control circuit 216 of the master AP 202 receives the response frame UPD from the coordination AP 204 via the RX circuit 220, where the response frame UPD is arranged to carry an updated coordination level at the coordination AP 204.

In summary, the protocol communications between APs of different BSSs may include a request phase, a response phase, and a setup or withdraw phase, and may further include one or more of optional phases, including an information collection phase, a traffic requirement collection phase, a local requirement collection phase, a teardown phase, and a coordination level update phase.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An access point (AP) comprising:
a transmitter (TX) circuit;
a receiver (RX) circuit; and
a control circuit, arranged to negotiate with at least one another AP via the TX circuit and the RX circuit, for setting up a coordinated service period (SP);
wherein the control circuit is further arranged to send a request frame to said at least one another AP via the TX circuit, and the request frame comprises a plurality of SP parameters; and the control circuit is further arranged to receive a response frame from said at least one another AP via the RX circuit, and send a setup frame to said at least one another AP via the TX circuit for setting up the coordinated SP after receiving the response frame.

2. The AP of claim 1, wherein the control circuit is further arranged to perform traffic requirement collection, such that the plurality of SP parameters are determined based at least partly on a traffic requirement collected from at least one non-AP station (STA).

3. The AP of claim 1, wherein the control circuit is further arranged to perform information collection, such that the plurality of SP parameters are determined based at least partly on information collected from said at least one another AP.

4. The AP of claim 1, wherein the plurality of SP parameters are determined based at least partly on own requirements of the AP.

5. The AP of claim 1, wherein the plurality of SP parameters comprise a parameter indicative of repetitions of the SP.

6. The AP of claim 1, wherein the plurality of SP parameters do not comprise a parameter indicative of repetitions of the SP.

7. The AP of claim 1, wherein the request frame is arranged to request to use the coordinated SP alone.

8. The AP of claim 7, wherein the response frame is arranged to carry a coordination level at said at least one another AP.

9. The AP of claim 7, wherein the response frame is arranged to carry load information of a basic service set (BSS) of said at least one another AP.

10. The AP of claim 1, wherein the request frame is arranged to request to share resources of the coordinated SP.

11. The AP of claim 10, wherein the plurality of SP parameters comprise an SP parameter indicative of a sharing method, and the sharing method is one of frequency division multiple access (FDMA), time division multiple access (TDMA), and coordinated spatial reuse (CSR).

12. The AP of claim 10, wherein the response frame is arranged to accept or reject SP coordination initiated by the AP.

13. The AP of claim 1, wherein the control circuit is further arranged to set the setup frame by updating at least a portion of the plurality of SP parameters.

14. The AP of claim 1, wherein the request frame is arranged to request to use the coordinated SP alone, and the control circuit is further arranged to receive another response frame from said at least one another AP via the RX circuit after sending the setup frame, and said another response frame is arranged to carry an updated coordination level at said at least one another AP.

15. The AP of claim 1, wherein the control circuit is further arranged to send a teardown announcement frame to said at least one another AP via the TX circuit after sending the setup frame, and the teardown announcement frame is arranged to tear down SP coordination between the AP and said at least one another AP.

16. The AP of claim 1, wherein the control circuit is further arranged to receive a teardown announcement frame from said at least one another AP via the RX circuit after sending the setup frame, and the teardown announcement frame is arranged to tear down SP coordination between the AP and said at least one another AP.

17. A method for setting up a coordinated service period (SP) in a multiple access point (AP) environment, comprising:
   sending a request frame from a first access point (AP) to at least one second AP, wherein the request frame comprises a plurality of SP parameters;
   receiving a response frame generated from said at least one second AP in response to the request frame; and
   in response to the response frame, setting up the coordinated SP by sending a setup frame to said at least one another AP, wherein the setup frame is set by updating at least a portion of the plurality of SP parameters.

* * * * *